United States Patent [19]

Patel

[11] Patent Number: 5,068,749
[45] Date of Patent: Nov. 26, 1991

[54] ELECTRONICALLY TUNABLE POLARIZATION-INDEPENDENT LIQUID CRYSTAL OPTICAL FILTER

[75] Inventor: Jayantilal S. Patel, Red Bank, N.J.

[73] Assignee: Bell Communications Research, Inc., Livingston, N.J.

[21] Appl. No.: 577,220

[22] Filed: Aug. 31, 1990

[51] Int. Cl.$^5$ .......................................... G02F 1/133
[52] U.S. Cl. ...................................... 359/93; 359/94; 356/352
[58] Field of Search ............... 350/346, 347 V, 347 E; 356/352

[56] References Cited

U.S. PATENT DOCUMENTS 4,630,898 12/1986 Jewell .................................. 350/393
4,779,959 10/1988 Saunders ............................. 350/346
4,790,634 12/1988 Miller et al. ....................... 350/347 V Primary Examiner—Stanley D. Miller
Assistant Examiner—Anita Pellman Gross
Attorney, Agent, or Firm—James W. Falk; Leonard Charles Suchyta

[57] ABSTRACT

By utilizing a twisted nematic liquid material in a Fabry-Perot etalon, an electronically tunable polarization-insensitive optical filter is realized. In particular, the twist imparted to the molecules of the liquid crystal material is established at $n\pi/2$, where n is a positive odd integer.

8 Claims, 1 Drawing Sheet

ELECTRONICALLY TUNABLE POLARIZATION-INDEPENDENT LIQUID CRYSTAL OPTICAL FILTER

BACKGROUND OF THE INVENTION

This invention relates to optical filters and, more particularly, to optical filters whose operation is based on varying the electro-optic properties of liquid crystal materials.

Liquid crystal optical filters are useful in a variety of applications of practical importance. In these applications, a liquid crystal filter provides an instrumentality for achieving electrically tunable wavelength selection.

In liquid crystal optical filters as heretofore proposed, the input light directed at the filter must be linearly polarized in a particular direction relative to the orientation of the liquid crystal molecules. Otherwise, the filter cannot be electrically tuned. In some applications, the polarization requirement imposed on the light directed at the filter is easily met. In other applications, however, such as in an optical fiber communication system wherein propagating light is generally elliptically polarized, such a requirement constitutes an undesirable and disadvantageous limitation.

Accordingly, efforts have continued which are aimed at trying to devise an electrically tunable liquid crystal filter whose operation would be insensitive to the polarization of input light. It was recognized that these efforts, if successful, could provide a compact low-power filter having operating requirements that would be viewed as advantageous in a variety of commercially important applications such as in optical fiber communication systems.

SUMMARY OF THE INVENTION

In accordance with the principles of the present invention, the molecular orientation of a nematic liquid crystal material included in a Fabry-Perot etalon is twisted in a prescribed fashion to achieve an electrically tunable polarization-insensitive optical filter. In particular, the twist imparted to the molecules of the liquid crystal is established at $n\pi/2$, where n is a positive odd integer.

BRIEF DESCRIPTION OF THE DRAWING

A complete understanding of the present invention and of the above and other features and advantages thereof will be apparent from a consideration of the detailed description set forth below taken in conjunction with the accompanying drawing, not drawn to scale, in which.

DETAILED DESCRIPTION

Figure 1:
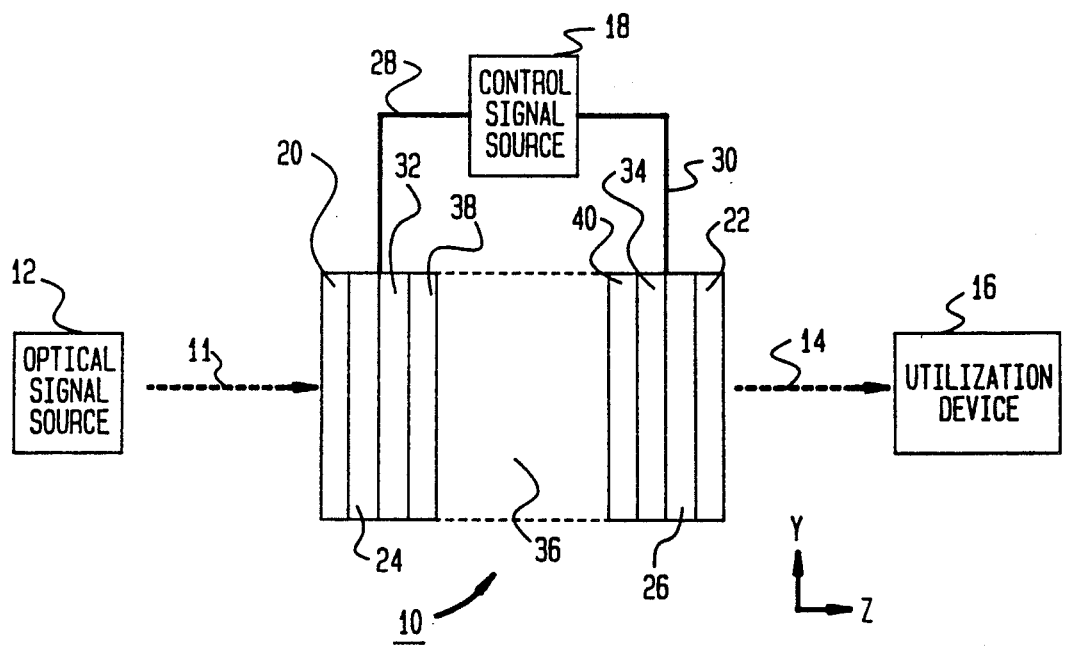
FIG. 1 is a simplified diagrammatic side-view representation of an optical filter made in accordance with the principles of the present invention, and FIG. 2 schematically depicts the contours of the longitudinal axes of liquid crystal molecules included in the FIG. 1 arrangement.

A specific illustrative optical filter 10 made in accordance with the principles of the present invention is represented in FIG. 1. Optical signals from a source 12 are directed at the left-hand side of the filter 10, as indicated by dash-line arrow 11. By way of example, the source 12 comprises a standard light-emitting diode and an associated optical fiber for applying signals to the filter 10.

The source 12 of FIG. 1 simultaneously supplies multiple input wavelengths in, for example, the range 1.4-to-1.6 micrometers ($\mu$m). Only a selected one of these wavelengths is passed by the filter 10 and delivered in the direction of arrow 14 to utilization device 16. The device 16 includes, for example, an optical fiber of the type included in a conventional wavelength-division-multiplexed communication system.

In accordance with the invention, a signal source 18 shown in FIG. 1 is utilized to apply electrical control signals to the filter 10. In the absence of an applied control signal, the filter 10 will pass to the device 16 an optical signal of a particular wavelength, as determined by the geometry and properties of the constituent parts of the filter 10. Above a specified operating threshold value, control voltages applied to the filter 10 are effective to change its electro-optic properties such that respectively associated wavelengths supplied by the source 12 are passed by the filter 10 to the device 16. In that way, an electrically tunable optical filter is realized.

The specific illustrative filter 10 shown in FIG. 1 comprises on its left-hand side a glass plate 20 through which input optical signals are transmitted and on its right-hand side another glass plate 22 through which output optical signals are transmitted. Disposed on the inner or facing surfaces of the plates 20 and 22 are optically transparent electrodes 24 and 26, respectively, which comprise, for example, standard layers of indium tin oxide. As indicated in FIG. 1, electrical leads 28 and 30 respectively connect the layers 24 and 26 to the control signal source 18.

The optical filter 10 of FIG. 1 further includes mirrors 32 and 34. Illustratively, the mirrors each include multiple layers of dielectric material, which is a conventional known design. By way of example, each of the mirrors 32 and 34 is designed to have a reflectivity of about 94 to 99.99 percent for the range of wavelengths to be transmitted by the filter 10.

The filter 10 (FIG. 1) including the spaced-apart mirrors 32 and 34 comprises in effect a Fabry-Perot etalon. As is well known, the geometry of such a device can be designed to be resonant at a particular wavelength (and multiples thereof). In that way, the device can be utilized to provide an output only at specified frequencies.

In accordance with the present invention, the filter of FIG. 1 is electrically tunable by changing the electro-optic properties of a layer 36 of a liquid crystal material that is contained between the mirrors 32 and 34. Moreover, due to the imposition initially of a particular orientation on the molecules of the liquid crystal material (described later below), the operation of the filter over its tuning range is independent of the polarization of input optical signals. In other words, the wavelength selected by the control source 18 for transmission by the filter 10 will be delivered to the utilization device 16 with the same output intensity regardless of the polarization of the input optical signals.

The layer 36 of liquid crystal material represented in FIG. 1 is, of course, retained in the indicated space by conventional spacer and sealing members (not shown). Illustratively, the layer 36 comprises a standard nematic liquid crystal material having elongated rod-like molecules characterized by positive dielectric anisotropy. In one particular illustrative embodiment, the thickness of the layer 36 in the indicated Z direction is only about 10 μm.

Interposed between the liquid crystal layer 36 (FIG. 1) and the mirrors 32 and 34 are so-called alignment layers. A variety of alignment materials suitable for use with liquid crystals are well known in the art. In particular, the mirror 32 includes on its righthand face a layer 38 of a conventional alignment material, whereas the mirror 34 includes on its lefthand face a layer 40 of a conventional alignment material.

Each of the alignment layers 38 and 40 is effective to impose a particular orientation on molecules in adjacent portions of the liquid crystal layer 36. Illustratively, each of the alignment layers 38 and 40 is initially rubbed in a particular direction to impose a corresponding orientation on adjacent liquid crystal molecules. Such rubbing of alignment layers to control the molecular orientation of liquid crystal materials is well known in the art.

In accordance with the present invention, the alignment layers 38 and 40 of FIG. 1 are designed to impose quiescently a particular twisted structure on the liquid crystal molecules included in the layer 36. The nature of this twist is schematically depicted in FIG. 2 which shows some of the rod-like liquid crystal molecules in the layer 36 disposed between the alignment layers 38 and 40.

Figure 2:
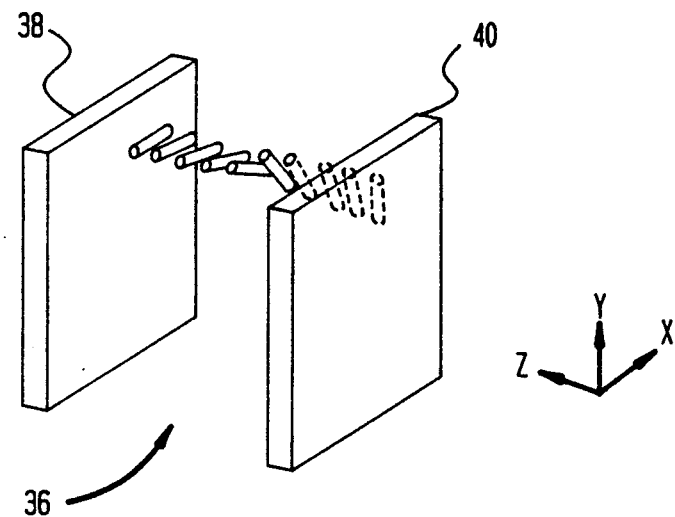

Illustratively, the liquid crystal molecules in the layer 36 of FIG. 2 are oriented to have a 90-degree or $\pi/2$ twist between the alignment layers 38 and 40. In this twisted orientation, molecules at the surface of the layer 38 are established to have their longitudinal axes parallel to the indicated X axis, whereas molecules at the surface of the layer 40 are established to have their longitudinal axes parallel to the indicated Y axis. As shown, the longitudinal axes of the molecules at these two surfaces are displaced 90 degrees with respect to each other. Between these surfaces, the longitudinal axes of the liquid crystal molecules gradually change in the Z direction from parallelism with the X axis to parallelism with the Y axis.

In accordance with the principles of the present invention, the amount of twist imparted to the molecules of a liquid crystal material included in an optical filter is defined by the term $n\pi/2$. For the particular illustrative case represented in FIG. 2, n equals 1. More generally, n can be any positive odd integer. Thus, for example, for n=3, the longitudinal axes of the liquid crystal molecules would undergo a rotation of 270 degrees in the layer 36 (FIG. 2) in the direction of the Z axis between the surfaces of the layers 38 and 40.

In the absence of an electrical control voltage applied to the electrodes 24 and 26 of the optical filter shown in FIGS. 1 and 2, both constituent orthogonal polarizations of a particular wavelength (and multiples thereof) will not be resonantly supported by the Fabry-Perot etalon, as determined, for example, by mirror spacing and the electro-optic properties of the liquid crystal layer 36. Only those particular wavelengths which are resonant will appear at the output of the filter. For each polarization condition, however, a different wavelength will be resonantly selected.

Assume now that an electrical control voltage is applied to the depicted filter to establish a Z-direction electric field. Until the magnitude of the electric field in the liquid crystal layer 36 reaches the well-known Friedricks threshold, the molecular orientation represented in FIG. 2 remains substantially unchanged. Above that threshold (for example, above about 2.0 volts for a 10-μm-thick layer 36), the longitudinal axis of molecules in the central portion of the layer 36 begin to align parallel to the Z axis. Molecules at the surfaces of the alignment layers 38 and 40, however, remain unaffected by the applied field because of strong anchoring forces at these surfaces. The thickness of the unaffected or substantially unaffected surface regions in the layer 36 is a function of the magnitude of the applied electric field. Thus, in response to the application thereto of an applied control voltage above the Friedricks threshold, the liquid crystal layer 36 includes two field-dependent variable-thickness birefringent regions at and near the respective surfaces of the alignment layers 38 and 40. Significantly, the principal optic axis in one such region is disposed at 90 degrees with respect to the principal optic axis in the other region. Accordingly, each of the constituent orthogonal polarization states of an input optical signal will be affected by the same amount irrespective of the input polarization state.

At an operating field strength above that of the Friedricks threshold (for example, above about 2.0 volts RMS at 1 KHz for E7 nematic liquid crystal material from EM Chemicals, Hawthorne, N.Y., for a 10-μm-thick liquid crystal layer 36), the thickness and electro-optic characteristics of the two aforespecified birefringent regions become substantially the same and then track each other as the applied control or tuning voltage is increased further. As a result, for a range of voltages above an operating or high-field value, the herein-described filter structure imparts the same phase change to each of the constituent orthogonal polarizations of an input optical signal. Thus, the wavelength passed by the structure is determined by a particular value of the applied voltage and is independent of the state of input polarization. In one of the birefringent regions, one constituent input polarization disposed approximately parallel to the principal axes of liquid crystal molecules in the one region is affected while it is unaffected in the other birefringent region. The other or orthogonal polarization component of the input optical signal is substantially unaffected in the first region while it is affected in the other birefringent region. A tunable polarization-insensitive optical filter is thereby realized. In such a filter, the wavelength selected by and corresponding to a particular applied voltage will be transmitted at the same intensity level regardless of its polarization condition.

A specific illustrative embodiment of the present invention includes a 10-μm-thick twisted nematic liquid crystal layer 36 of the type represented in FIG. 2. The index of refraction of such a layer can be varied between approximately 1.5 and 1.7 by applying thereto high-field operating voltages in the range of 2 to 10 volts. (For such an embodiment, the Friedricks threshold voltage is about 2 volts). For each of selected input wavelengths, there is a corresponding operating control voltage that when applied to the filter will permit a particular input wavelength to be transmitted therethrough. Changing the control voltage by a specified amount will cause another input wavelength to be selected for transmission. In the particular specified example, wavelengths spaced apart by 2 nm in a tuning range of 15 nm are respectively selected by changing the control voltage in steps of about 0.5 volts. Wavelengths passed by such a filter are characterized by a spectral passband width of about 1 nm.

An optical filter of the type specified above can be switched relatively rapidly from a condition in which it passes one wavelength to a condition in which it passes another wavelength. The switching speed is dictated primarily by how fast the liquid crystal molecules in the layer 36 can be re-oriented. In turn, this depends on a variety of factors such as the dielectric anisotropy of the liquid crystal material, the value of the control voltage and the thickness of the liquid crystal layer 36. Illustratively, switching speeds in the order of milliseconds are feasible in practice. Moreover, the power required to switch such a compact microminiature filter is typically less than a microwatt.

Finally, it is to be understood that the above-described arrangements are only illustrative of the principles of the present invention. In accordance with these principles, numerous modifications and alternatives may be devised by those skilled in the art without departing from the spirit and scope of the invention. For example, in one modification a polarization-insensitive filter is achieved by combining two layers of liquid crystal material that are physically separated from each other. In this modification, the two layers are contained within the optical cavity formed by the aforedescribed mirrors and electrode structure and are retained in place by a sandwich structure that includes three spaced-apart glass plates. The optic axes of the two layers are arranged respectively orthogonal to each other so that light of any polarization experiences the same phase shift. In this modification, it is important that the thickness of the two liquid crystal layers be the same to insure polarization-insensitive operation.

Additionally, it is apparent that the devices described herein can be used as polarization-insensitive spatial light modulators. In operation, two voltages are applied to such a modulator. One voltage is chosen to allow a selected wavelength to propagate through the device. The other operating voltage is designed to cause the device to block the selected wavelength from passing therethrough.

What is claimed is:

1. An optical device comprising
spaced-apart planar mirrors,
a layer of a liquid crystal material in the space between said mirrors said material comprising molecules each having a principal axis,
means for establishing a twist of $n\pi/2$ of the principal axes of said material across said space, where n is a positive odd integer,
and means for applying an electric field across said space to untwist the molecules in a central portion of said layer.

2. A device as in claim 1 wherein said liquid crystal material comprises elongated molecules each having a longitudinal axis.

3. A device as in claim 2 wherein said liquid crystal material comprises a nematic liquid crystal material.

4. A device as in claim 3 wherein said means for establishing a twist comprises alignment layers in contact with respective opposed surfaces of said layer of liquid crystal material.

5. A device as in claim 4 wherein the principal axes of the liquid crystal molecules at one surface of said liquid crystal layer lie parallel to the surface of the alignment layer that contacts said one liquid crystal surface, wherein the principal axes of the liquid crystal molecules at the other surface of said liquid crystal layer lie parallel to the surface of the alignment layer that contacts said other liquid crystal surface, and wherein the principal axes of the liquid crystal molecules at said one surface are displaced by $n\pi/2$ with respect to the principal axis of the liquid crystal molecules at said other surface.

6. A device as in claim 5 wherein said means for applying an electric field comprises two optically transparent planar electrodes respectively spaced from and in line with the opposed surfaces of said layer of liquid crystal material.

7. A device as in claim 6 wherein said means for applying an electric field further comprises a signal source connected to said electrodes for applying a control voltage thereto.

8. An optical communication system comprising
an optical filter including
spaced-apart planar mirrors,
and a layer of a liquid crystal material in the space between said mirrors, said material comprising molecules each having a principal axis, said material having a twist of $n\pi/2$ of the principal axes of said material across said space, where n is a positive odd integer,
an input source for applying randomly polarized multiple-wavelength optical signals to said filter,
a source for applying electrical control signals to said filter to establish an electric field across said space to untwist the molecules in a central portion of said layer, the values of said signals being selected to control the electro-optic properties of said filter to pass corresponding respective ones of said input wavelengths,
and a utilization device positioned to recieve optical signals passed by said filter.

* * * * *

UNITED STATES PATENT AND TRADEMARK OFFICE
CERTIFICATE OF CORRECTION

PATENT NO. : 5,068,749
DATED     : November 26, 1991
INVENTOR(S) : Jayantilal S. Patel It is certified that error appears in the above-identified patent and that said Letters Patent is hereby corrected as shown below:

In the Abstract, line 1, "liquid material" should read --liquid crystal material--;
line 2, "electronically turnable" should read --electrically tunable--.

Column 5, line 34, "thickness" should read --thicknesses--.
Column 6, line 54, "recieve" should read --receive--.

Signed and Sealed this

Eleventh Day of May, 1993

Attest:

MICHAEL K. KIRK

Attesting Officer    Acting Commissioner of Patents and Trademarks